United States Patent
Bell et al.

(10) Patent No.: US 8,681,146 B2
(45) Date of Patent: Mar. 25, 2014

(54) SYSTEM AND METHOD FOR VIEW MANAGEMENT IN THREE DIMENSIONAL SPACE

(75) Inventors: Blaine A. Bell, New York, NY (US);
Steven K. Feiner, New York, NY (US);
Tobias H Hoellerer, Santa Barbara, CA (US)

(73) Assignee: The Trustees of Columbia University in the City of New York, New York, NY (US)

( * ) Notice: Subject to any disclaimer, the term of this patent is extended or adjusted under 35 U.S.C. 154(b) by 0 days.

(21) Appl. No.: 12/496,882

(22) Filed: Jul. 2, 2009

(65) Prior Publication Data
US 2010/0141648 A1    Jun. 10, 2010

Related U.S. Application Data (63) Continuation of application No. 10/477,872, filed as application No. PCT/US02/15576 on May 16, 2002, now Pat. No. 7,643,024.

(60) Provisional application No. 60/291,798, filed on May 17, 2001.

(51) Int. Cl.
*G06T 15/00* (2011.01)

(52) U.S. Cl.
USPC ............................ 345/419; 345/420; 345/473

(58) Field of Classification Search
None
See application file for complete search history.

(56) References Cited

U.S. PATENT DOCUMENTS

| | | | |
|---|---|---|---|
| 4,642,790 A | | 2/1987 | Minshull et al. |
| 4,819,189 A | | 4/1989 | Kikuchi et al. |
| 5,430,831 A | * | 7/1995 | Snellen .......................... 700/217 |
| 5,515,494 A | | 5/1996 | Lentz |
| 5,574,836 A | * | 11/1996 | Broemmelsiek .............. 345/427 |
| 5,657,463 A | | 8/1997 | Bingham |
| 5,825,363 A | * | 10/1998 | Anderson ...................... 345/422 |
| 5,835,692 A | | 11/1998 | Cragun et al. |
| 5,982,389 A | * | 11/1999 | Guenter et al. ............... 345/474 |

(Continued)

FOREIGN PATENT DOCUMENTS

| WO | WO1995/12194 | 5/1995 |
|---|---|---|
| WO | WO01/82279 | 11/2001 |

OTHER PUBLICATIONS

Gobbetti, E., Bouvier, E., Time-critical Multiresolution Scene Rendering, Oct. 1999, Proceedings of the 10th IEEE Visualization 1999 Conference, pp. 1-8.*

(Continued)

*Primary Examiner* — Said Broome
(74) *Attorney, Agent, or Firm* — Baker Botts, L.L.P.

(57) ABSTRACT

A method for managing a display space for a 3D environment is provided. A 3D scene having at least one scene object is displayed and the visible surfaces of the scene objects are represented as visible space in a 2D view plane representation. Controllable objects that are to be placed in the scene are defined by parameters such as size, placement priority, proximity relationships and the like. The available space for placing controllable objects, which can include empty space and low priority background and foreground regions, is determined for each controllable object. The placement for controllable objects in the 3D space is then determined in accordance with at least placement parameter and one of the visible space and available space of the view-plane representation such that view management objectives, such as not occluding important scene objects, are accomplished.

31 Claims, 8 Drawing Sheets

(56) References Cited

U.S. PATENT DOCUMENTS

| | | | |
|---|---|---|---|
| 6,008,809 A | 12/1999 | Brooks | |
| 6,023,275 A * | 2/2000 | Horvitz et al. | 715/700 |
| 6,115,052 A | 9/2000 | Freeman et al. | |
| 6,215,496 B1 | 4/2001 | Szeliski et al. | |
| 6,266,064 B1 | 7/2001 | Snyder | |
| 6,344,863 B1 | 2/2002 | Capelli et al. | |
| 6,359,603 B1 | 3/2002 | Zwern | |
| 6,654,036 B1 | 11/2003 | Jones | |
| 6,690,393 B2 * | 2/2004 | Heron et al. | 715/757 |
| 6,928,621 B2 | 8/2005 | Conrad et al. | |
| 7,404,147 B2 | 7/2008 | Bell et al. | |
| 7,643,024 B2 | 1/2010 | Bell et al. | |
| 8,234,580 B2 | 7/2012 | Bell et al. | |
| 2009/0037841 A1 | 2/2009 | Bell et al. | |

OTHER PUBLICATIONS

Bernard, M., Jacquenet, F., Free space modeling for placing rectangles without overlapping, Jun. 1997, Journal of Universal Computer Science, pp. 703-720.*
U.S. Appl. No. 10/258,510, Jun. 3, 2008 Issue Fee payment.
U.S. Appl. No. 10/258,510, May 23, 2008 Notice of Allowance.
U.S. Appl. No. 10/258,510, May 2, 2008 Response to Final Office Action.
U.S. Appl. No. 10/258,510, Mar. 4, 2008 Final Office Action.
U.S. Appl. No. 10/258,510, Aug. 3, 2007 Response to Non-Final Office Action.
U.S. Appl. No. 10/258,510, Jun. 7, 2007 Non-Final Office Action.
U.S. Appl. No. 10/258,510, Mar. 12, 2007 Response to Non-Final Office Action.
U.S. Appl. No. 10/258,510, Oct. 13, 2006 Non-Final Office Action.
U.S. Appl. No. 12/124,797, Jan. 19, 2012 Notice of Allowance.
U.S. Appl. No. 12/124,797, Oct. 4, 2011 Response to Non-Final Office Action.
U.S. Appl. No. 12,124,797, May 9, 2011 Non-Final Office Action.
U.S. Appl. No. 10/477,872, Nov. 20, 2009 Issue Fee payment.
U.S. Appl. No. 10/477,872, Aug. 24, 2009 Notice of Allowance.
U.S. Appl. No. 10/477,872, Jul. 2, 2009 Response to Non-Final Office Action.
U.S. Appl. No. 10/477,872, May 13, 2009 Non-Final Office Action.
U.S. Appl. No. 10/477,872, Feb. 9, 2009 Reponse to Non-Final Office Action.
U.S. Appl. No. 10/477,872, Aug. 7, 2008 Non-Final Office Action.
U.S. Appl. No. 10/477,872, May 20, 2008 Amendment and Request for Continued Examination (RCE).
U.S. Appl. No. 10/477,872, Nov. 20, 2007 Final Office Action.
U.S. Appl. No. 10/477,872, Oct. 15, 2007 Response to Notice of Non-Compliant.
U.S. Appl. No. 10/477,872, Sep. 13, 2007 Notice of Non-Compliant.
U.S. Appl. No. 10/477,872, Sep. 7, 2007 Response to Non-Final Office Action.
U.S. Appl. No. 10/477,872, Jun. 7, 2007 Non-Final Office Action.
U.S. Appl. No. 10/477,872, Apr. 3, 2007 Response to Final Office Action.
U.S. Appl. No. 10/477,872, Nov. 24, 2006 Final Office Action.
U.S. Appl. No. 10/477,872, Sep. 8, 2006 Response to Non-Final Office Action.
U.S. Appl. No. 10/477,872, Mar. 13, 2006 Non-Final Office Action.
"Free-Space Search for Best Fit Placement of New Desktop Objects," *IBM Technical Disclosure Bulletin,* vol. 37, No. 1, Jan. 1994, pp. 455-456.
Myers, "A Complete and Efficient Implementation of Covered Windows," Computer IEEE Computer Society, Long Beach, CA, vol. 19, No. 9, Sep. 1986, pp. 57-67.
Samet, "The design and analysis of spatial data structures", *Addison-Wesley,* Reading, MA, 1990.
Thibault et al., "Set operations on polyhedra using binary space partitioning tress", *Computer Graphics,* 21(4): 153-162, Jul. 1987 (Proc. SIGGRAPH '87).
Chen et al., "View interpolation for image synthesis", Sep. 1, 1993, SIGGRAHO '93, Proceedings of the 20th annual conference on Computer Graphics and Interactive Techniques, pp. 279-288.
U.S. Appl. No. 13/451,085, filed Apr. 19, 2012.
U.S. Appl. No. 12/124,797, Apr. 19, 2012 Issue Fee Payment.

* cited by examiner

SYSTEM AND METHOD FOR VIEW MANAGEMENT IN THREE DIMENSIONAL SPACE

CLAIM FOR PRIORITY TO RELATED APPLICATIONS

This application is a continuation of U.S. patent application Ser. No. 10/477,872, filed Jun. 14, 2004 now U.S. Pat. No. 7,643,024, which is a national phase of International Application PCT/US02/015576, filed May 16, 2002, which claims the benefit of U.S. Provisional Patent Application Ser. No. 60/291,798, filed on May 17, 2001, entitled View Management For Virtual And Augmented Reality, the contents of which is are hereby incorporated by reference in their entirety.

STATEMENT OF GOVERNMENT RIGHTS

The present invention was made in part with support from the National Library of Medicine, Grant No. 5-R01 LM06593-02 and the Office of Naval Research, Contract Nos. N00014-99-1-0683, N00014-99-1-0249 and N00014-99-1-0394. Accordingly, the United States government may have certain rights to this invention.

FIELD OF THE INVENTION

The present invention relates generally to three dimensional imaging and more particularly relates to a system and method for managing the placement of controllable objects in a three dimensional projection.

BACKGROUND OF THE INVENTION

Computer graphics systems which are commonly used today generally provide a representation of the workspace, or display screen, occupied by the various elements of the scene. Designing a graphical user interface (GUI) for viewing and manipulating a virtual three-dimensional (3D) space requires creating a set of objects and their properties, arranging them in a scene, setting a viewing specification, determining lighting and rendering parameters, and deciding how to update these decisions for each frame. Some of these decisions may be fully constrained; for example, a simulation may determine the position and shape of certain objects, or the viewing specification may be explicitly controlled by the user. In contrast, other decisions must be resolved by the GUI designer. Of particular interest are those decisions that determine the spatial layout of the projections of objects on the view plane. These decisions can be referred to collectively as view management. For example, some objects may be sufficiently important to the user's task that they should not be occluded. In addition, the members of a group of related objects may need to be placed together to emphasize their relationship.

In a static scene, observed from a fixed viewing specification, view-management decisions might be made in advance, by hand, and hold throughout the life of an application. It is also common in both 2D and 3D interactive GUIs to avoid automating view management when possible. For example, a fixed area of the screen may be dedicated to a menu, or the user may explicitly control the positions of permanent menus or temporary pop-up menus, or the positions and sizes of windows. However, hard-wired or direct-manipulation control becomes problematic when applied to dynamic scenes that include autonomous objects and to head-tracked displays. In this type of situation, continual and unpredictable changes in object geometry or viewing specification result in continual changes in the spatial and visibility relationships among the projections on the view plane. In these cases, view-management decisions must be made on the fly if they are to take dynamic changes into account.

Augmented reality applications are especially challenging in this regard. Virtual and physical objects reside in the same 3D space and there may be no way to control the behavior of many of the physical objects. For example, the view through an optical see-through head-worn display includes all the physical objects that occupy the user's field of view in addition to the virtual objects being displayed. In this case, the portion of the field of view that can be augmented may be relatively small.

It would be desirable to manage the virtual space such that objects could be added or moved in a controlled manner. For example, it would be desirable if virtual annotations could be added to the virtual space and interspersed among the objects they describe and reconfigured automatically and understandably to take into account changes in the objects themselves and how they are viewed.

SUMMARY OF THE INVENTION

A method for managing a display space for a 3D environment includes the steps of determining the visible surfaces of at least one first object in a 3D environment and representing the visible surfaces of the at least one first object as visible space in a view-plane representation. A plurality of controllable objects to be placed in the scene are defined and for each controllable object, the available space in the view-plane representation is determined. The placement of each controllable object in the 3D scene is then determined in accordance with at least one placement parameter and the available space for the controllable object in the view-plane representation.

Also in accordance with the present invention is a method of annotating scene objects in a frame of a 3D environment. The method includes determining the visible surfaces of at least one scene object in a 3D environment and representing the visible surfaces as visible space in a view-plane representation. At least one annotation object associated with at least one scene object to be placed in the scene is defined. If the annotation object fits within the visible surfaces of the associated scene object, then the annotation object is placed within the extents of the visible surfaces of the associated scene object. The placement of annotation objects which cannot be placed within the extents of the visible surface of the associated scene object in the 3D scene is determined in accordance with at least one placement parameter and the visible space of the view-plane representation. The annotation objects can then be displayed in the 3D environment in accordance with the determined placement.

BRIEF DESCRIPTION OF THE DRAWING

Further objects, features and advantages of the invention will become apparent from the following detailed description taken in conjunction with the accompanying figures showing illustrative embodiments of the invention, in which.

Throughout the figures, the same reference numerals and characters, unless otherwise stated, are used to denote like features, elements, components or portions of the illustrated embodiments. Moreover, while the subject invention will now be described in detail with reference to the figures, it is done so in connection with the illustrative embodiments. It is intended that changes and modifications can be made to the described embodiments without departing from the true scope and spirit of the subject invention as defined by the appended claims.

DETAILED DESCRIPTION OF PREFERRED EMBODIMENTS

Figure 1:
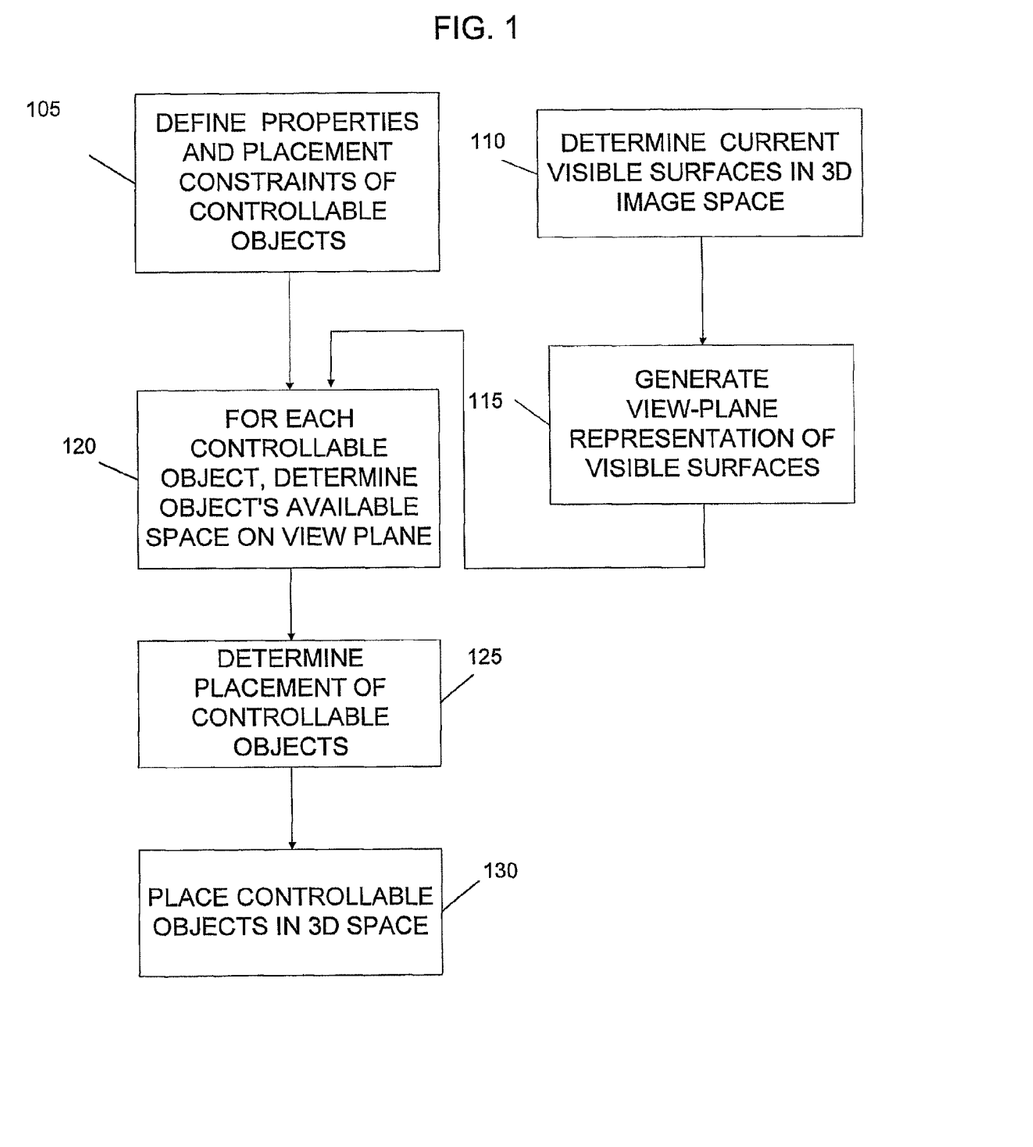
FIG. 1 is a flow chart illustrating an overview of a method of 3D view management in accordance with the present invention.

FIG. 1 is a flow chart illustrating an overview of a method of 3D view management for a current frame of a 3D scene in accordance with the present invention. A 3D image of a frame of a scene or object is to be generated in a conventional manner. The 3D image can be displayed in a number of ways which are well known in the art, such as a conventional 2D display device, such as a CRT or LCD screen, stationary, non-stationary, handheld, or head-worn displays for virtual reality or augmented reality applications, including head tracked display devices, and the like. In 3D rendering, objects having defined properties of size, position, opacity, and the like are placed in the 3D virtual space and are rendered in perspective from a particular view point. Based on the view point of the user and the properties of the objects in the 3D virtual space, referred to herein as scene objects, certain surfaces of the scene objects will be visible, while others will be occluded by other scene objects. Objects whose position and geometry are fixed with respect to the scene will be referred to herein as non-controllable scene objects. Objects whose position and/or size or other visibility constraint can be altered will be referred to herein as controllable objects.

Controllable objects are associated with a variety of properties and placement constraints that will determine if and where the objects will be placed in the 3D space. The object properties can include minimum and maximum object size, minimum font size, aspect ratio and other constraints on how the object can appear in the space. The placement constraints generally relate to where the object can be placed. Placement constraints can refer to the image space in general, to non-controllable scene objects, and to other controllable objects. The placement constraints can be a single constraint, such as "always place A centered within B" or a more flexible set of hierarchical rules which determine placement based on a prioritized rule set. For example a rule set for placing controllable object A with respect to object B could be, "if B is large enough to accept A with minimum font=8 point, place A within B, else place A above B without overlapping any other scene object." These two examples are not exhaustive and merely serve to illustrate the concept of placement parameters for controllable objects.

Based on the particular application, the object properties and placement constraints (placement parameters) will be defined for each controllable object (step 105). In certain applications, controllable objects can be grouped by object type, such as labels, which may have a common set, or subset, of placement constraints.

For a current frame of the 3D image space, the set of visible surfaces of objects placed in the view space from a selected view point will be determined (step 110). The visible surfaces of the non-controllable scene objects are projected into a 2D representation of the scene, referred to as a view-plane representation (step 115). Based on the view-plane representation and the properties and placement constraints of the controllable objects, such as labels, annotations, user controlled icons, and the like, the available space for each controllable object is determined (step 120). As used herein, the term available space refers to space in the view-plane which satisfies the properties and placement constraints of the particular controllable object. Once the available space for the controllable objects is determined, the placement of the controllable objects is determined (step 125). From the determined placement in the view-plane, the controllable objects can be placed in the 3D space (step 130).

The controllable object properties can include a placement priority which determines the order in which the controllable objects will be placed. The placement constraints can relate to both non-controllable scene objects as well as other controllable objects. As a result, it can be desirable for the available space for the controllable objects to be determined in priority order, determining the placement of higher priority objects first and determining the available space for subsequent controllable objects in consideration of such placement. For example, if lower priority objects are not allowed to overlap higher priority controllable objects, previously non-occupied space now occupied by a previously placed higher priority object would no longer be available space for the lower priority object. Such a "greedy algorithm" can be performed by repeating steps 115, 120 and 125 for each controllable object, in the order of priority. Preferably, only those portions of the view-plane representation affected by the placement of an object are recalculated when steps 115, 120 and 125 are repeated.

The available space for a controllable object is determined by that object's properties and placement constraints. However, in some cases, objects can be grouped by an object type, such as label, which have common properties and placement constraints. In certain cases, non-controllable objects will include placement constraints that prevent overlap with the visible surfaces of the scene objects. In such cases, in addition to having a data structure which defines the visible space in the view-plane, it can be efficient to maintain a second data structure describing the space in the view-plane which is not occupied by objects of interest. Although such areas in the 3D scene are not generally truly empty, these regions can collectively be referred to as non-occupied space areas and can be considered available for certain types of controllable objects. For example, it may be determined that any type of controllable object can be placed in regions of the 3D image space which are occupied by grass. In this case, any visible regions in the 3D image space identified as grass regions can be considered non-occupied space.

Figure 10:
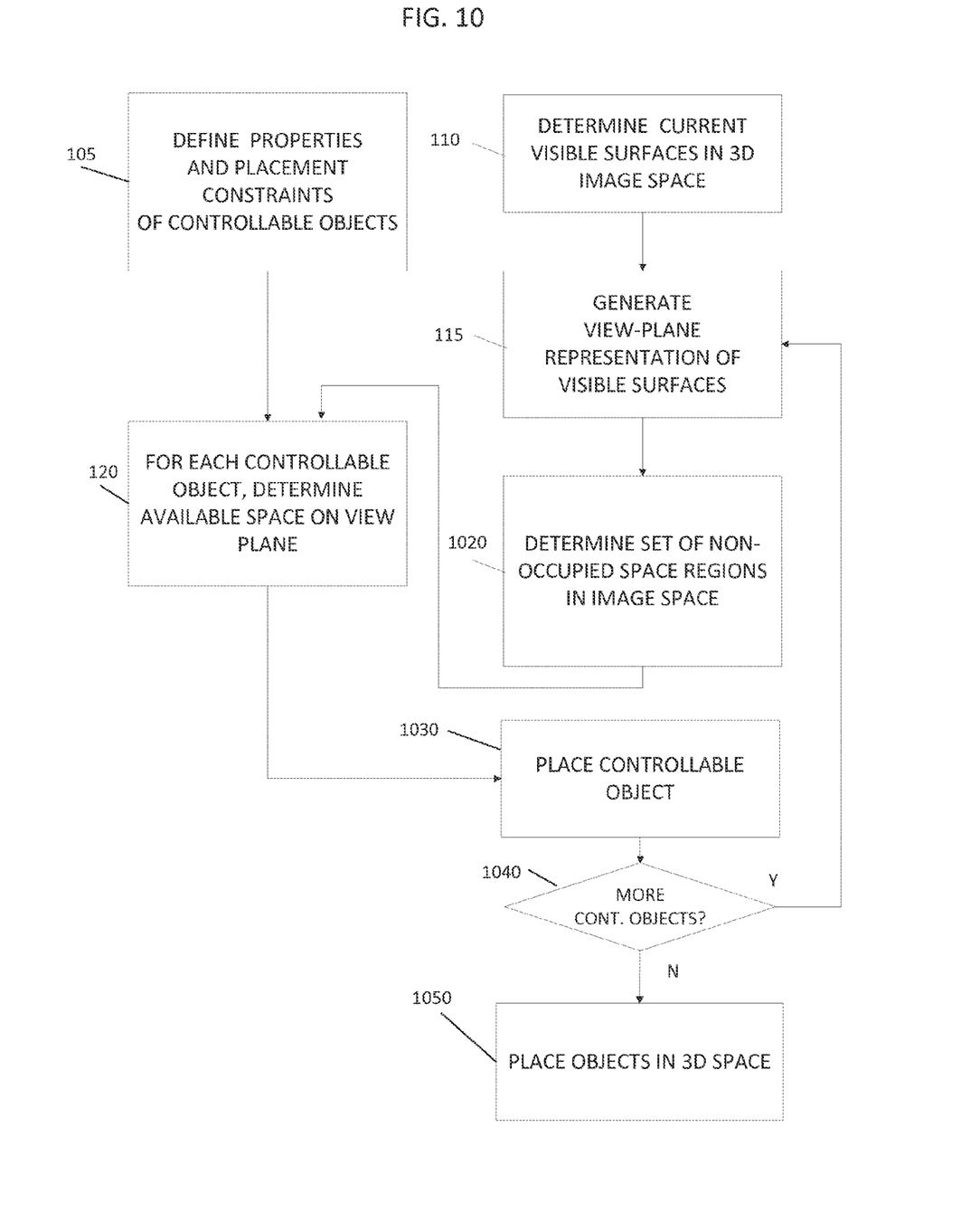
FIG. 10 is a flow chart illustrating an alternate method of 3D view management in accordance with the present invention.

FIG. 10 illustrates an alternate method in accordance with the present invention for determining the placement of objects in a 3D space which represents both the visible space and non-occupied space of the current frame in a view plane representation. Referring to the flow chart of FIG. 10, steps 105, 110 and 115 are substantially similar to that described above with respect to FIG. 1. Following step 115, the non-occupied space is represented as the set of largest axis-aligned non-occupied space rectangles defined by the extents of the view-plane and the visible surfaces in the image space (step 1020). For each object in turn in priority order, the available space on the view plane will be determined (step 120). For those objects which have placement constraints that result in placement in the non-occupied space, the set of non-occupied space rectangles can be queried to determine the non-occupied space rectangle which best satisfies the placement constraints for the controllable object. FIG. 10 illustrates a greedy algorithm wherein the objects are placed (step 1030) and if there are additional objects (step 1040) to be placed the flow returns to step 115 where the view-plane representation is updated prior to determining the available space for the next controllable object. When all of the controllable objects have been placed in the view-plane, the controllable objects can be placed in the 3D space, such as by displaying such objects in the scene.

Figure 2:
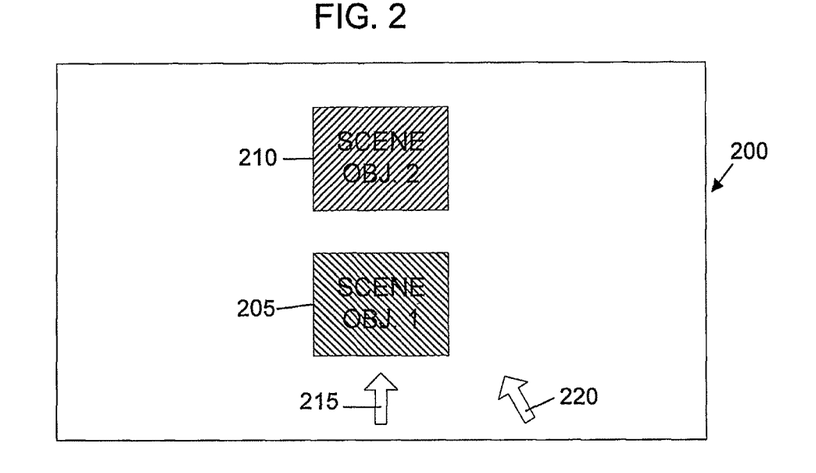
FIG. 2 is a top plan view of a scene having two scene objects to be displayed in a 3D space.

The present invention can be further described by way of example. FIG. 2 is a top plan view illustrating an example of a virtual space 200 which has two objects, scene object 1 205 and scene object 2 210. If these scene objects have a position and geometry which is fixed, such as buildings or other fixed scene objects, these objects will be considered non-controllable scene objects. Not withstanding the designation of objects as "non-controllable," it will be appreciated that certain parameters of the object which do not affect the geometry or position of the object may be altered. While the objects can be viewed from any location in the virtual space 200, two selected view points 215, 220 are shown as examples. The scene objects can be any arbitrary objects to be viewed or manipulated in the 3D space, such as buildings as part of a virtual map or tour.

Figure 3:
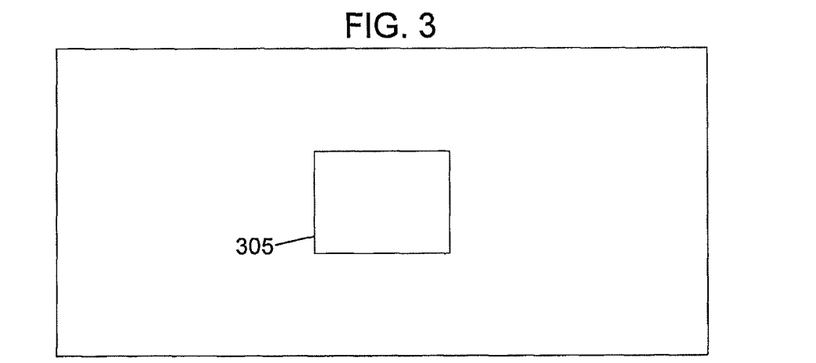
FIG. 3 is a view of the visible surfaces of the two scene objects from a first view point.

FIG. 3 illustrates the visible surface 305 of scene object 1 and scene object 2 from the first view point 215, which is taken from a direct front view of scene object 1 205. In this view, scene object 2 210 is completely occluded by scene object 1 and does not present any visible surfaces. In this simple example, the view plane representation of the visible surfaces in the current view could be represented by a single axis aligned rectangle 305 projected into the 2D view-plane. As used herein, an axis aligned rectangle is a rectangle whose horizontal axis and vertical axis are aligned with a respective horizontal axis and vertical axis of the view-plane representation of the environment. While non-axis aligned rectangles, and other geometric entities can be used to approximate the visible surface areas, it will be appreciated that such less constrained geometries will increase processing time and complexity.

Figure 4:
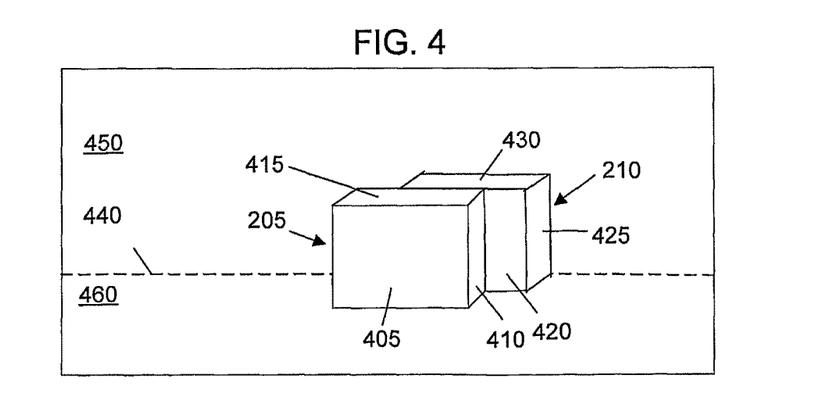
FIG. 4 is a view of the visible surfaces of the two scene objects from a second view point.

FIG. 4 illustrates a more generalized example where scene object 1 205 and scene object 2 210 are observed from the second view point 220, which is taken from a front right view of scene object 1 205. As illustrated in FIG. 4, in addition to the front surface 405 of scene object 1 205, this second view point also exposes the right side 410 and top surface 415 of scene object 1 and also exposes a portion of the front surface 420 of scene object 2 as well as the right side 425 and top surface 430 of this object.

Figure 5:
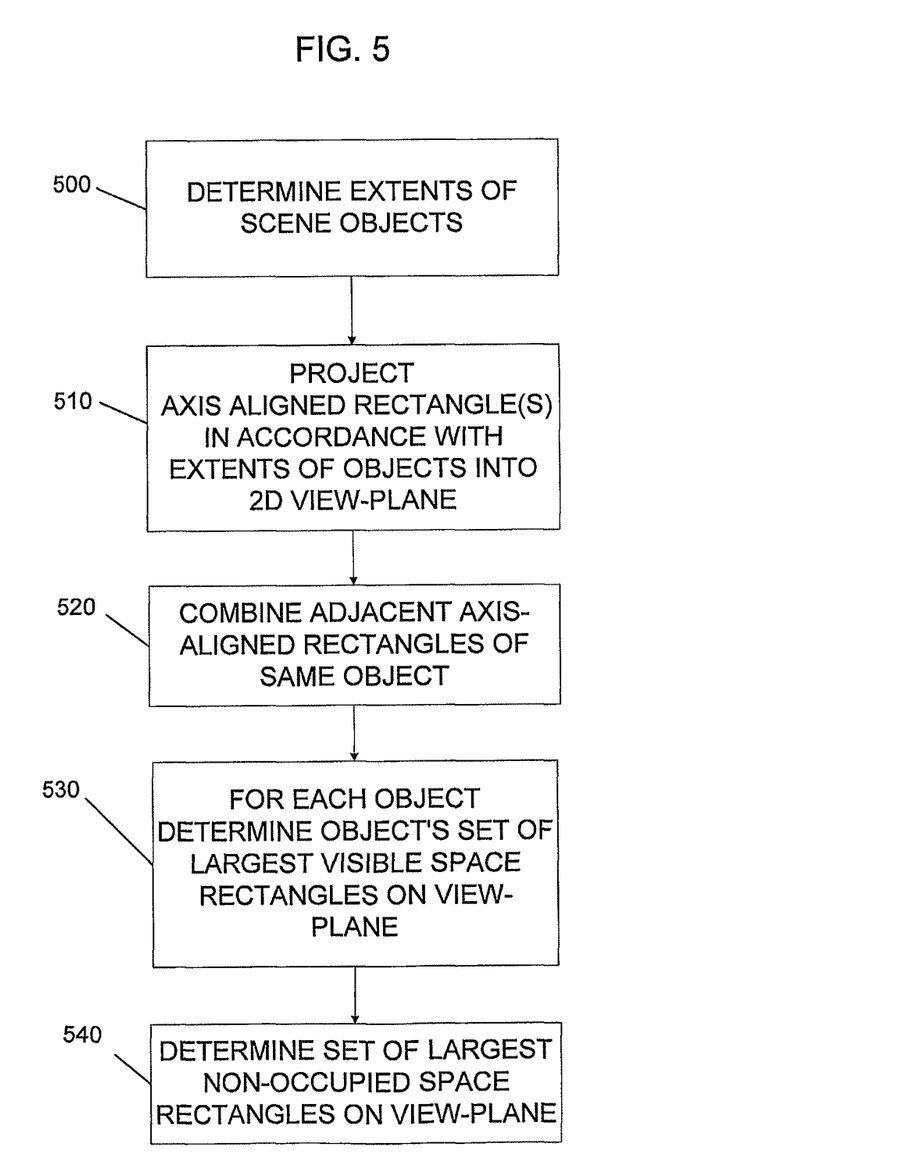
FIG. 5 is a flow chart illustrating a method of representing visible surfaces in a 3D environment in a 2D view-plane representation.

FIG. 5 is a flow chart illustrating an example of a method of representing visible surfaces in a 3D environment in a 2D view-plane representation. A number of approaches can be used to determine which surfaces of the objects in the scene are visible from a particular view point. One such method includes the use of a binary space partitioning tree. The visible surfaces can also be determined by using a Z-buffer algorithm. The Z-buffer algorithm can operate at the same resolution as the rendered scene or can be performed at a lower resolution than the rendered scene. In connection with the use of the binary space partitioning tree, in step 500, the extents of the scene objects are determined for the current scene view. In one embodiment, which is particularly useful for real-time operation, the extents of the scene objects can be estimated by 2D axis aligned rectangles which fully encompass the extents of the visible surfaces of the individual scene objects. The extents of the scene objects are estimated and projected into the 2D view plane representation. Referring again to FIG. 5, in step 510, the axis aligned rectangles defined around the extents of each object are projected into the 2D view-plane representation of the scene in visibility order. As will be described below in further detail, use of the BSP tree can result in objects being partitioned into adjacent rectangles on the view plane. Therefore, a step of combining adjacent axis aligned rectangles of the same object on the view-plane is performed (step 520). The set of largest visible space rectangles on the view-plane can then be determined (step 530). If desired, the set of largest non-occupied space rectangles on the view plane can also be determined (step 540).

The use of the BSP tree will now be described in greater detail. Visible-surface determination can be performed by sorting the upright extents of the scene objects' projections in visibility order, such as front to back with respect to the view point. In the present case, visible-surface determination for interactive rendering is accomplished independently of the process for view-plane space determination, preferably by the use of specialized graphics hardware. A Binary Space Partitioning (BSP) Tree algorithm such as is described in the article entitled "Set Operations on Polyhedra Using Binary Space Partitioning Trees," by W. Thibault et al, Computer Graphics, 21(4), pp. 153-162 July 1987 (Proc. SIGGRAPH '87), which is hereby incorporated by reference in its entirety, can be used to efficiently produce the visibility order for an arbitrary projection of a scene. A BSP tree is a binary tree whose nodes typically represent actual polygons (or polygon fragments) in the 3D scene. Because in the present case it is desirable to determine the visibility order for objects, rather than for the polygons of which they are composed, BSP tree nodes in the present invention are generally defined by planes that separate objects, rather than planes that embed objects' polygons. The partitioning planes can be chosen by using the heuristics described by Thibault et al. in the article referenced above. Although BSP trees are often used for purely static scenes, dynamic objects can be handled efficiently by adding these objects to the tree last and removing and adding them each time the objects move.

Figure 6:
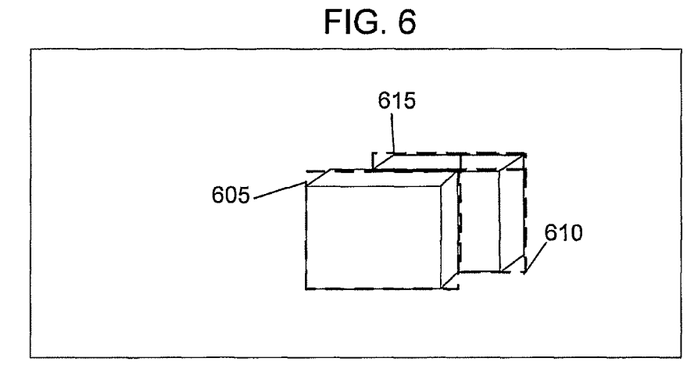
FIG. 6 is a pictorial diagram illustrating the use of axis-aligned rectangles to represent the approximate extents of the visible surfaces in the 3D environment.
Figure 7:
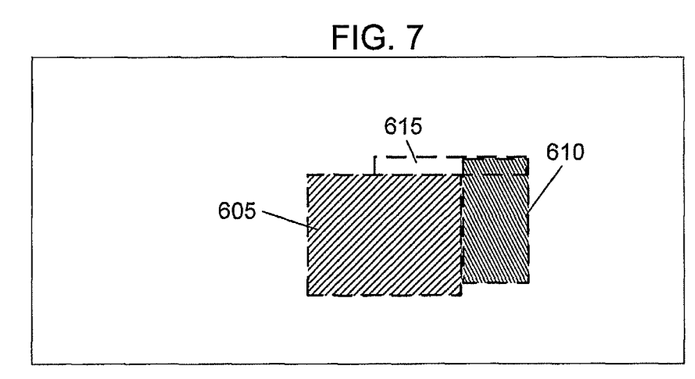
FIG. 7 is a pictorial diagram of the 2D view-plane representation of visible surfaces for the scene depicted in FIG. 4.

Referring to FIG. 6, the scene of FIG. 4 is illustrated with the extents of the visible surfaces of scene object 1 205 defined by a first axis-aligned rectangle 605. Scene object 2 205 is partially occluded by scene object 1. The visible surfaces of scene object 2 205 are defined by two axis aligned rectangles 610, 615. Axis aligned rectangle 610 encompasses the right-hand surface 425, the exposed portion of the front surface 420 and a portion of the top surface 430 of scene object 2. A third axis aligned rectangle 615 encompasses the visible top surface 430 and a portion of the right-hand surface 425 of scene object 2. FIG. 7 illustrates the projection of the three axis aligned rectangles 605, 610 and 615 into the 2D view-plane representation.

When visible surface determination is performed using a BSP tree algorithm, the process of generating the view-plane representation can be performed by traversing the BSP tree in front-to-back order relative to the view point to find the visible portions of the scene's objects. The 2D space representation is projected to determine approximations of the visible space and non-occupied space portions of the view plane. For each node obtained from the BSP tree in front-to-back order, the new node's upright extent is intersected with the members of the current list of largest non-occupied space rectangles. This can be performed efficiently by maintaining the set of largest non-occupied space rectangles in a 2D interval tree, such as described by H. Samet in the text "The Design and Analysis of Spatial Data Structures," Addison-Wesley, Reading, Mass., 1990, or other suitable data structure, to allow an efficient window query to determine the members that actually intersect the extent. The intersection yields a set of rectangles, some of which may be wholly contained within others. Those rectangles which are subsumed in other rectangles are eliminated, resulting in a set of largest rectangles whose union is the visible portion of the new node.

During the process of determining the visible surfaces in the scene, scene objects may be intersected by projection planes of the binary space partitioning tree and, as a result, represented on the view-plane by two or more visible surface regions which are adjacent to one another. As a result, some objects are represented by a single BSP tree node, while others are split across nodes. (Objects may be split during BSP tree construction, or split prior to BSP tree construction to better approximate a large object by the upright extents of a set of smaller objects.) Therefore, it is preferable for a node's visible rectangles to be coalesced with those of all previously processed nodes from the same object to create the list of largest rectangles in the union of the nodes.

Figure 8:
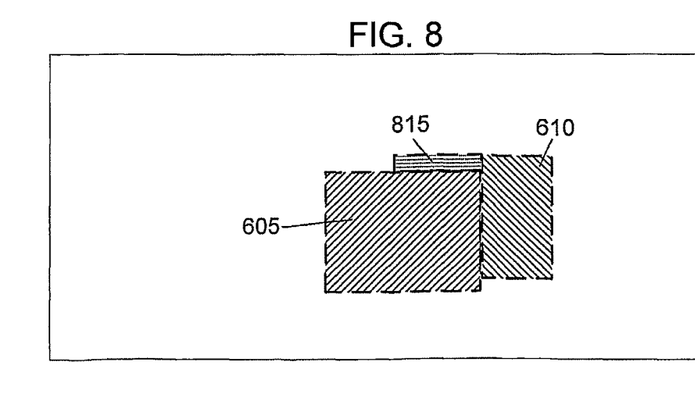
FIG. 8 is a pictorial diagram of the view-plane representation of visible surfaces for the scene depicted in FIG. 4 for a case where a binary space partitioning tree operation results in a splitting of the visible space rectangles representing a scene object.

For example, it is possible for a partitioning plane for the binary space partitioning tree to be placed adjacent to the right surface 410 of scene object 1 205. In this case, instead of the visible surfaces of scene object 2 being represented as two overlapping rectangles 610, 615, scene object 2 would be represented in separate nodes of the BSP tree as rectangle 815 and adjacent rectangle 610, as illustrated in FIG. 8. Because of the possibility that objects can be partitioned and represented in separate nodes of the BSP tree, it is desirable to have an additional operation wherein the rectangles representing the extents of the objects in the 2D view-plane representation are coalesced into largest axis aligned rectangles for each object (FIG. 5, step 520). In the case of FIG. 8, the merging of visible space rectangles 815 and 610 would yield the two largest visible space rectangles 615, 610, previously illustrated in FIG. 6.

Returning to FIG. 5, following the coalescing of the set of largest visible space rectangles on the view plane can be determined (step 530) and the set of largest non-occupied space rectangles can then be determined (step 540). The process for determining the set of largest non-occupied space rectangles can be performed in a manner similar to that described in International patent application PCT/US01/13167, entitled SYSTEM AND METHOD FOR DYNAMIC SPACE MANAGEMENT OF A DISPLAY SPACE, published on Nov. 1, 2001 under publication number WO 01/82279 A3, which is hereby incorporated by reference in its entirety.

As discussed above, the visible surface of objects can be estimated by largest rectangles which encompass the extents of the object's visible surfaces. In certain cases, this may result in an inefficient allocation of the view plane. In order to more efficiently allocate the view plane, the extents of the visible surfaces of an object can be represented by a set of multiple, smaller rectangles which more closely follow the contours of the object. For example, consider an object whose visible extents is shaped like the letter T. This object, when estimated by a single rectangle will be allocated far more space on the view plane than necessary. However, if the extents of the object's vertical portion is represented by a first rectangle and the extents of the horizontal portion represented by as second rectangle, it will be appreciated that the view plane now more efficiently represents the visible space of the object.

As noted above, empty space is generally not truly empty, but can include regions of the scene which have been deemed as available for the placement of controllable objects. For example, referring to FIG. 4, the scene may include a horizon line 440. Above the horizon line 440 can be a region 450 rendered as sky and below horizon line 440 can be a region 460 rendered as foreground, such as grass. While regions 450 and 460 are not empty, these regions may, by definition by the user, be considered as available space in which controllable objects may be placed. In other words, the object constraints for regions 450 and 460 do not prevent having these regions blocked or occluded by controllable objects placed in the scene. In such a case, regions 450 and 460 can be grouped together, along with any empty space regions, in defining a set of non-occupied space rectangles in the view-plane representation. This process is illustrated in graphical form in FIG. 11.

Figure 11:
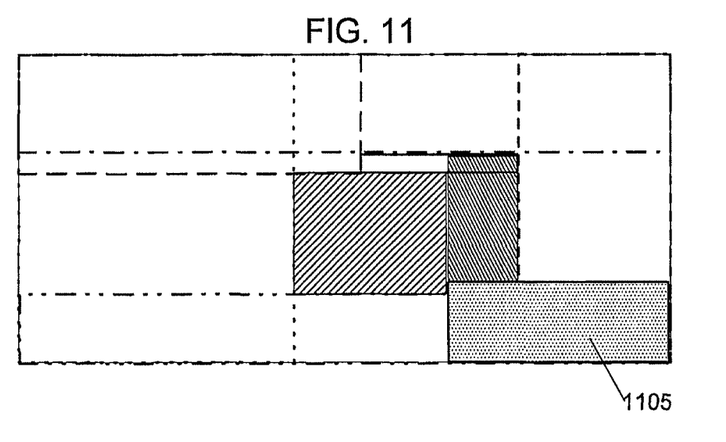
FIG. 11 is a pictorial diagram of the view-plane representation of visible surfaces for the scene depicted in FIG. 4 and further illustrating the largest non-occupied space axis aligned rectangles which are defined on the view-plane representation.

The 2D view-plane representation of FIG. 11 can be represented in computer readable media as a first data structure of visible rectangles and a second data structure of non-occupied space rectangles. Using this view-plane representation, the available space for the placement of controllable objects, such as labels, annotations, user interface control boxes, text boxes into the 3D scene can be determined in a manner which enhances the scene and complies with the placement constraints of the scene objects and controllable objects.

A common form of controllable object is an annotation which provides information about an object in the 3D scene, such as a label which identifies a scene object in the 3D scene. In order to be meaningful, such annotations should be uniquely associated with the object. One preferred way of associating an annotation with an object is to place the annotation entirely within the visible space of the object or, alternatively, placed in closely located available space with a leader line connecting the annotation to the object. In addition, in many applications, such as labeling, it is undesirable for the annotations, once placed, to overlap each other.

Figure 9:
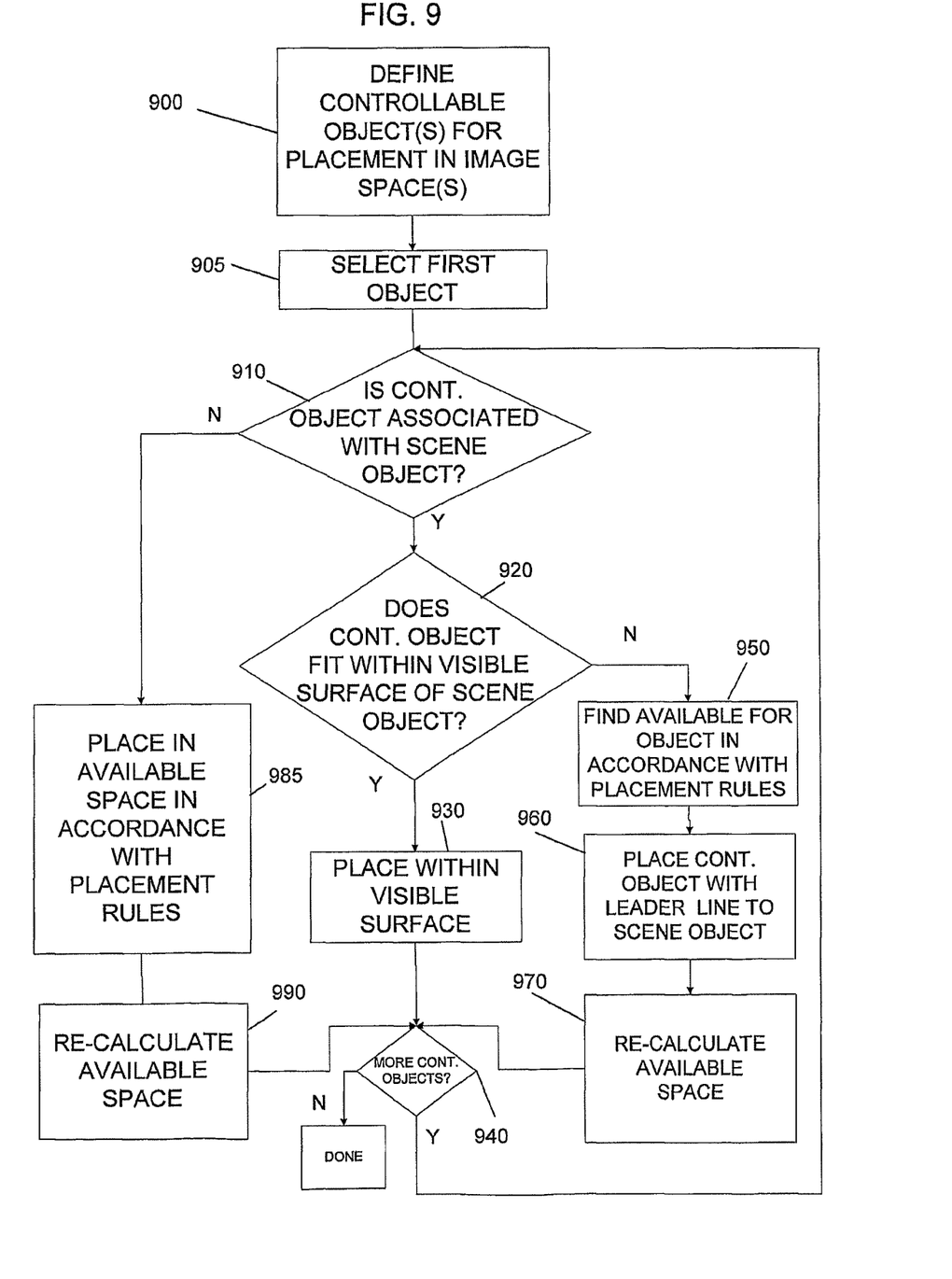
FIG. 9 is a flow chart illustrating a method of placing controllable objects in a suitable position in a 3D environment based on the 2D view-plane representation.

FIG. 9 is a flow chart that illustrates an example of the present invention in the form of a process of placing controllable objects, such as annotations, within the 3D scene in accordance with the 2D view plane. A controllable object can be defined by the user or predefined by the system's GUI. Controllable objects can be defined by properties and constraints such as total size, width, height, aspect ratio, font size, opacity, priority and the like. Thus, in step 900, the parameters of the controllable objects, such as annotations are defined. If more than one controllable object is to be placed, a first controllable object is selected, such as in a priority order (step 905). Controllable objects (cont. object) can have placement constraints which are associated with a particular scene object. This determination is made in step 910. In the case of labels, these controllable objects are generally associated with a particular scene object and have a size which is largely determined by the label's text string, font type, and minimum font size. In the case of controllable objects which are associated with a particular scene object, it can be desirable to place the controllable object within the visible rectangle of the scene object. Thus, such a controllable object would have a placement constraint defining such preferred placement. To do this, the controllable object must fit entirely within at least one visible rectangle associated with the scene object (step 920). If this condition is satisfied, the controllable object is placed within the confines of the scene object and, if additional objects are to be placed, the next controllable object is selected (step 940) and flow returns to step 910. To avoid overlap of the controllable objects, the placement of the controllable objects in this example is generally determined in accordance with the priority assigned to the controllable objects or the scene objects with which the controllable objects are associated.

If in step 920, it is determined that the controllable object does not fit within the extents of a visible rectangle of the associated scene object, the controllable object will be placed in a suitable available space rectangle, generally near the associated scene object, in accordance with placement constraints for the object. The view-plane representation is queried to determine the set of available space rectangles that are large enough to receive the controllable object (step 950). In the event that there is more than one acceptable available space rectangle, one or more placement parameters associated with the object can be used to select one available space rectangle from the set. For example, rules can include relationships such as: closest to, smallest, adjacent, above, below, left of, right of, and the like. Such rules can be used alone or in combination in selecting the appropriate available space rectangle. Once an available space rectangle is selected, the controllable object is placed within the selected available space rectangle in a size an position consistent with the placement constraints for the object (step 960).

In order to avoid overlap or occlusion of the newly placed controllable object, the space occupied by the controllable object is designated as visible space and the available space in the view plane is recalculated (step 970). The next object is selected (step 940) and the process is repeated for each controllable object to be placed. If the controllable object will not fit within any visible space rectangle or suitable available space rectangle, the controllable object will not be placed unless a rule giving this object priority is provided.

If in step 910, it is determined that a controllable object to be placed is not associated with a scene object, placement for the object will be made in accordance with placement rules associated with the object and the scene. For example, a pop-up text box for user notes may have an associated rule that places this object in the uppermost available space rectangle large enough to receive it. Scene-based rules may also be used, such as maintaining a central region of the scene free of controllable objects, such as may be desirable when using a see through head mounted display unit to view the 3D environment simultaneously with the surrounding physical environment and other users in a collaborative setting. In such a case, the controllable object is placed in accordance with the placement parameters (step 985) and the non-occupied space in the 2D view-plane is recalculated (step 990). The next object is selected (step 940) and the process repeats for the next controllable object with flow returning to step 910.

Figure 12:
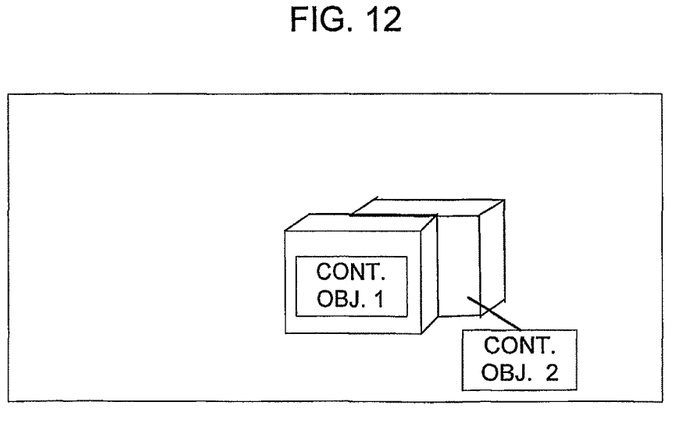
FIG. 12 is a pictorial diagram illustrating a method of placing controllable objects in a suitable position in the 3D environment of FIG. 4 based on the 2D view-plane representation.

FIG. 12 is a pictorial example illustrating the placement of two controllable objects, such as labels, associated with scene objects 205, 210 from FIG. 4. Controllable object 1 is associated with scene object 1 205. This controllable object fits within the visible rectangle 605 (FIG. 6) of scene object 1 and is placed therein. Controllable object 2 is associated with scene object 2 210. Controllable object 2 does not fit within either of the two visible space rectangles 610, 615 for scene object 2. Therefore, controllable object 2 is placed in an available space rectangle for this object in proximity to scene object 2. As illustrated in FIG. 10, a number of available space rectangles could be selected to receive controllable object 2. The placement shown in FIG. 11, within available space rectangle 1105, is consistent with rules "below" and "smallest." Since the controllable object is placed outside the confines of the visible rectangle of the associated scene object, a leader line can be provided between the scene object and the controllable object. A leader line can also be placed in accordance with placement constraints. For example, a leader line can originate at the center of the label and can terminate at the center of the largest visible space rectangle of the object it refers to. Based on constraints of the leader line, the portions of the leader line overlapping the label or object need not be visible.

As is evident from FIGS. 3 and 4, as the view point changes, the visible surfaces of the scene objects change, and therefore, the available space representation in the view plane also changes. Thus, for each frame of the 3D scene, the process of determining the placement of objects is applied. As the projection of the scene changes, the controllable objects within the scene need to be repositioned in accordance with the visible space and available space of the current frame. It is desirable to avoid large transitory jumps of objects within the space as the scene changes. Therefore, in the event that because of a scene change, a significant change in placement of a controllable object is required, this should be performed in a controlled and continuous manner. There are several methods which can be used to improve the temporal continuity of the display as the scene changes, such as state hysteresis, positional stability and interpolation.

To avoid having a controllable object repeatedly jump between two positions as the scene undergoes minor changes in view point from one frame to the next, it is desirable to include state hysteresis in the positioning of the controllable objects. There are several situations in which objects may change state, resulting in a discrete visual change, such as from an internal label to external one, or from being displayed to not being displayed. Some GUIs use three constraints on the size of an object being displayed: minimum size, maximum size, and preferred size (e.g., Java 2D). As shown in the state diagram of FIG. 13 this approach can be extended by modifying the definition of minimum size by defining both an absolute minimum size (absMin) and a sustained minimum size (min) to provide state hysteresis and avoid oscillation between states at size boundary conditions.

In the present state hysteresis analysis, the position of an object in the previous frame is compared to an ideal position for the object in the current frame. If these two positions are not the same, a timer is initiated. If at the end of the timer interval, the current position of the object is not the ideal position, the object is then moved to the new ideal position. This may result in a momentary positioning which is not ideal, but avoids the undesirable jumping or flickering of the controllable objects within the image.

Figure 13:
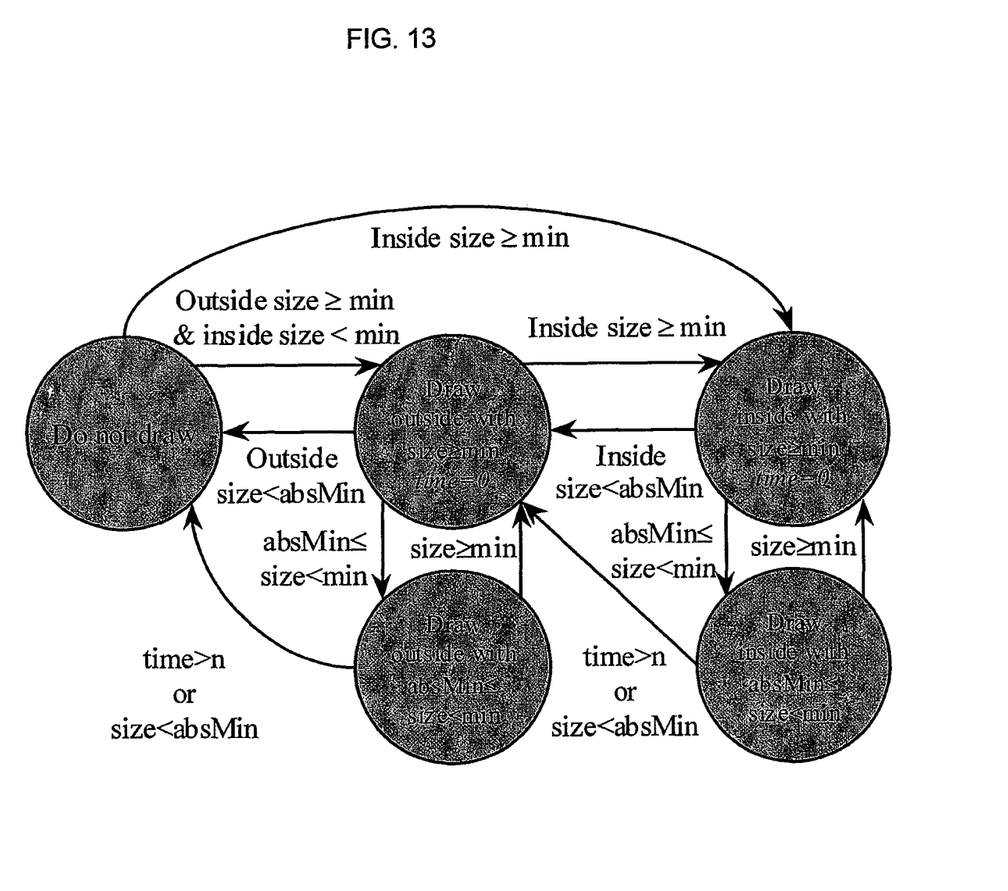
FIG. 13 is a state diagram illustrating a method for improving frame to frame temporal continuity in the placement of objects in a 3D environment.

Referring to FIG. 13, an object's visual size is can be guaranteed to be the pre-defined sustained minimum size min at least once within a settable time interval n. The system will display the object only when there is enough space for the sustained minimum size min, and removes the object when it is below the pre-defined absolute minimum size absMin. Furthermore, if the object is already being displayed and there is only enough space for an object within the absolute and sustained minimum sizes (absMin and min, respectively) for time >n, the object is removed. Otherwise, the object is displayed at the largest possible size no greater than its maximum size. The state diagram of FIG. 13 employs similar tests to make an additional distinction between drawing an object inside an associated object as compared to outside another object, which can be used for displaying area feature labels. The values selected for n and the difference between the absolute minimum and sustained minimum sizes help avoid visual discontinuities.

In addition to state hysteresis, it is desirable to place objects being laid out in the 3D scene in roughly the same position relative to an associated object or to a screen position if the available object is screen-stabilized as in the previous frame. This is referred to as positional stability. For an object L being placed relative to object A, two possible layouts can be computed: the best possible layout independent of the previous layout, and the closest possible layout to the previous layout. For example, when L is an internal label for A, the best possible layout may be to use the visible space in A that can contain the largest allowable version of L. To determine the closest possible layout to the previous layout, the position of L's centroid is computed in the previous frame relative to A's unclipped width and height in the previous frame. These proportions can then be used to compute from A's unclipped width and height in the current frame, a predicted position $L^C$ for L's centroid. Next, the best and closest possible layouts are compared. If they are the same, then this layout is used. If the layouts are different, a timer is initiated and if the best and closest fail to coincide after a set amount of time, the best position is selected and the timer is reset.

A third method of improving temporal continuity is to interpolate between certain kinds of discrete changes. For example, to minimize the effect of discontinuous jumps during the state changes discussed above, L is interpolated from its previous position and scale to its new ones. In changing from internal to external annotations, the object or leader line can also grow or shrink.

In placing the controllable object into the 3D scene, it is preferable to place the controllable object at a depth, e.g., z-dimension in the 3D scene, which corresponds to the associated scene object. In the case of stereo display devices, the present invention can be implemented by determining the view plane for a single eye, an average distance between the two eyes or individually for each eye.

The present system and methods have been implemented in Java 1.3 with Java 3D 1.2.1.01. The software was operated on a 1.4 GHz Intel Pentium 4 processor with 512 MB RAM and a SONICBlue FireGL 2 graphics board, running Windows 2000. The visible-surface processing performed by the methods described herein is only used for view-management operations. Rendering is accomplished through a separate processing engine, such as Java3D. While performance depends on the complexity of the scene, the present system runs at about 10-25 frames per second in stereo for an 800× 600 resolution Sony LD1-D100B head-worn display (with the view-plane representation computed for a single eye).

The present invention can be implemented on various computer platforms and use various input devices and display devices. Examples include a conventional CRT display of a 3D space, such as a college campus, wherein the scene objects represent buildings on the campus and the controllable objects include labels identifying the building names and selectable annotations, including text or multimedia supplements associated with a particular building. Thus an interactive tour can be provided in a 3D environment to one or more users in either a stationary or mobile embodiment. More sophisticated examples of the present invention include stationary or mobile augmented reality environments where multiple users engage in a collaboration with respect to a 3D environment which is presented to each user through see-through head-mounted or hand held or stationary display units, such as the Sony LD1-D100B head-worn display. In a collaborative setting, controllable objects can be further defined as "private" to a particular user and "public" to all or a group of collaborators.

Although the present invention has been described in connection with specific exemplary embodiments, it should be understood that various changes, substitutions and alterations can be made to the disclosed embodiments without departing from the spirit and scope of the invention as set forth in the appended claims.

What is claimed is:

1. A method for managing a display space for a 3D environment comprising:

determining visible surfaces of a plurality of non-controllable scene objects in the 3D environment and representing the visible surfaces of the plurality of non-controllable scene objects as visible space in a view-plane representation, using a computer processor, wherein at least one of the plurality of non-controllable scene objects overlaps with another of the plurality of non-controllable scene objects in the view-plane representation;

defining at least one controllable object to be placed in the 3D environment;

for each controllable object, determining an available space in the view-plane representation; and determining a placement of each controllable object in the 3D environment in accordance with at least one placement parameter and the available space for the controllable object in the view-plane representation, wherein the controllable objects are displayed using a head-tracked display device, wherein a particular controllable object is associated with one of the plurality of non-controllable objects and wherein, if the particular controllable object fits within the visible space of the associated non-controllable object, then the placement of the particular controllable object is determined to be within the extents of the visible surfaces of the associated non-controllable object, otherwise, if the particular controllable object does not fit within the visible space of the associated non-controllable object, then the placement of the particular controllable object in the 3D environment is determined in accordance with at least one placement parameter and the available space for the controllable object in the view-plane representation.

2. The method for managing a display space of claim 1, wherein the visible space for each object is represented as rectangles which are axis aligned with respect to the view-plane representation.

3. The method for managing a display space of claim 2, wherein the axis aligned rectangles comprise the set of largest visible space rectangles on the view-plane representation.

4. The method for managing a display space of claim 1, wherein the available space for each object is represented as rectangles which are axis aligned with respect to the view-plane representation.

5. The method for managing a display space of claim 4 wherein the axis aligned rectangles comprise the set of largest available space rectangles on the view-plane representation.

6. The method for managing a display space of claim 1, wherein a set of available space rectangles is determined from the view-plane representation and one available space rectangle from said set is selected based on the at least one placement parameter.

7. The method for managing a display space of claim 1, wherein the at least one placement parameter includes a relationship to the position of the projection of the controllable object in a previous frame of the 3D scene.

8. The method for managing a display space of claim 7, wherein the relationship to the position of the projection of the controllable object in the previous frame includes temporal state hysteresis.

9. The method for managing a display space of claim 7, wherein the relationship to the position of the controllable object in the previous frame includes positional stability with respect to an associated object.

10. The method for managing a display space of claim 7, wherein the relationship to the position of the controllable object in the previous frame includes interpolating between a last frame position and a current frame position.

11. The method for managing a display space of claim 1, wherein the controllable objects are displayed in a 3D environment in accordance with the determined placement.

12. A method of annotating scene objects in a frame of a 3D environment comprising:
   determining visible surfaces of a plurality of non-controllable scene objects in the 3D environment and representing the visible surfaces of the plurality of non-controllable scene objects as visible space in a view-plane representation, using a computer processor, wherein at least one of the plurality of non-controllable scene objects overlaps with another of the plurality of non-controllable scene objects in the view-plane representation;
   defining at least one annotation object associated with one of the plurality of non-controllable scene objects;
   for each of the at least one annotation object, if the annotation object fits within the visible space of the associated non-controllable scene object, then placing the annotation object within the extents of the visible surfaces of the associated non-controllable scene object in the 3D environment, otherwise, if the annotation object does not fit within the visible space of the associated non-controllable scene object, determining an available space for the annotation object in the view-plane representation and placing the annotation object in the 3D environment in accordance with at least one placement parameter and the available space for the annotation object in the view-plane representation; and
   displaying the annotation objects in the 3D environment in accordance with the placement,
   wherein the annotation objects are displayed using a head-tracked display device.

13. The method for annotating scene objects of claim 12, wherein the visible space is represented as rectangles which are axis aligned with respect to the view-plane representation.

14. The method for annotating scene objects of claim 12, wherein the available space is represented as rectangles which are axis aligned with respect to the view-plane representation.

15. The method for annotating scene objects of claim 12, wherein a set of available space rectangles proximate the associated non-controllable scene object is determined from the view-plane representation and one rectangle from said set is selected based on at least one placement rule.

16. The method for annotating scene objects of claim 12, wherein the at least one placement rule is related to the position of the annotation object in a previous frame of the 3D scene.

17. A method for managing a display space for a 3D environment comprising:
   determining visible surfaces of a plurality of non-controllable scene objects in the 3D environment and representing the visible surfaces of the plurality of non-controllable scene objects as visible space in a view-plane representation, using a computer processor, wherein at least one of the plurality of non-controllable scene objects overlaps with another of the plurality of non-controllable scene objects in the view-plane representation;
   defining at least one controllable object to be placed in the 3D environment;
   for each controllable object, determining an available space in the view-plane representation; and
   determining a placement of each controllable object in the 3D environment in accordance with at least one placement parameter and the available space for the controllable object in the view-plane representation
   wherein a particular controllable object is associated with one of the plurality of non-controllable scene objects and wherein, if the particular controllable object fits within the visible space of the associated non-controllable scene object, then the placement of the particular controllable object is determined to be within the extents of the visible surfaces of the associated non-controllable scene object, otherwise, if the particular controllable object does not fit within the visible space of the associated non-controllable scene object, then the placement of the particular controllable object in the 3D environment is determined in accordance with at least one placement parameter and the available space for the controllable object in the view-plane representation.

18. The method for managing a display space of claim 17, wherein the visible space for each object is represented as rectangles which are axis aligned with respect to the view-plane representation.

19. The method for managing a display space of claim 17, wherein the available space for each object is represented as rectangles which are axis aligned with respect to the view-plane representation.

20. The method for managing a display space of claim 17, wherein a set of available space rectangles is determined from the view-plane representation and one available space rectangle from said set is selected based on the at least one placement parameter.

21. The method for managing a display space of claim 17, wherein the at least one placement parameter includes a relationship to the position of the controllable object in a previous frame of the 3D scene.

22. The method for managing a display space of claim 21, wherein the relationship to the position of the controllable object in the previous frame includes temporal state hysteresis.

23. The method for managing a display space of claim 21, wherein the relationship to the position of the controllable object in the previous frame includes positional stability with respect to an associated object.

24. The method for managing a display space of claim 21, wherein the relationship to the position of the controllable object in the previous frame includes interpolating between a last frame position and a current frame position.

25. The method for managing a display space of claim 17, wherein the controllable objects are displayed in a 3D environment in accordance with the determined placement.

26. The method for managing a display space of claim 17, wherein the controllable objects are displayed using a head-tracked display device.

27. The method for managing a display space of claim 17, wherein the controllable objects are displayed using a stereo display device.

28. The method for managing a display space of claim 17, wherein the visible space for each object is represented as set of largest visible space rectangles which are axis aligned with respect to the view-plane representation.

29. The method for managing a display space of claim 17, wherein the available space for each object is represented as a set of largest available space rectangles which are axis aligned with respect to the view-plane representation.

30. The method for managing a display space of claim 1, wherein determining the placement of each controllable object comprises:
    determining the placement of a first controllable object in accordance with at least one placement parameter and the available space for the controllable object in the view-plane representation; and
    determining the placement of a second controllable object in accordance with at least one placement parameter, the available space for the controllable object in the view-plane representation, and the placement of the first controllable object.

31. The method for managing a display space of claim 17, wherein determining the placement of each controllable object comprises:
    determining the placement of a first controllable object in accordance with at least one placement parameter and the available space for the controllable object in the view-plane representation; and
    determining the placement of a second controllable object in accordance with at least one placement parameter, the available space for the controllable object in the view-plane representation, and the placement of the first controllable object.

* * * * *